United States Patent
Chang et al.

(10) Patent No.: US 8,350,898 B2
(45) Date of Patent: *Jan. 8, 2013

(54) HEAD-MOUNTED VISUAL DISPLAY DEVICE WITH STEREO VISION AND ITS SYSTEM

(75) Inventors: Yin Chang, Taipei (TW); Yen-Liung Lai, Kaohsiung (TW); Ji-Min Li, Taipei (JP); Yu-Wei Du, Tainan (TW)

(73) Assignee: National Yang-Ming University, Taipei (TW)

( * ) Notice: Subject to any disclaimer, the term of this patent is extended or adjusted under 35 U.S.C. 154(b) by 419 days.

This patent is subject to a terminal disclaimer.

(21) Appl. No.: 12/784,753

(22) Filed: May 21, 2010

(65) Prior Publication Data

US 2011/0134319 A1    Jun. 9, 2011

(30) Foreign Application Priority Data

Dec. 3, 2009    (TW) ................................ 98141298 A

(51) Int. Cl.
*H04N 9/47* (2006.01)
*H04N 13/00* (2006.01)
*H04N 13/02* (2006.01)
*H04N 13/04* (2006.01)

(52) U.S. Cl. ................. 348/53; 348/42; 348/46; 348/51

(58) Field of Classification Search ........................ None
See application file for complete search history.

(56) References Cited

U.S. PATENT DOCUMENTS

| | | | |
|---|---|---|---|
| 7,098,868 B2 * | 8/2006 | Love et al. ...................... 345/1.1 |
| 8,130,263 B2 * | 3/2012 | Chang et al. .................... 348/62 |
| 2004/0177191 A1 * | 9/2004 | MacInnis et al. .............. 710/240 |
| 2005/0146492 A1 * | 7/2005 | Baba et al. ...................... 345/87 |
| 2006/0152618 A1 * | 7/2006 | Yamasaki ...................... 348/345 |
| 2007/0200803 A1 * | 8/2007 | Kimura ........................... 345/76 |

* cited by examiner

*Primary Examiner* — Joseph Ustaris
*Assistant Examiner* — Ellyar Y Barazesh
(74) *Attorney, Agent, or Firm* — Muncy, Geissler, Olds & Lowe, PLLC

(57) ABSTRACT

A head-mounted visual display device for low-vision aid, which features 2 models, they are analog signal model and digital signal model. Said analog device contains at least an analog video extractor, a video decoder, an ITU-R.656 decoder, a de-interlacing unit, an image processor, two YCbCr to RGB converter, two color enhancement units, two video D/A converter, a head mounted display, a signal voltage controller and a wireless communication module. Said digital device consists of a digital video signal extractor/capturer, a RGB to YCbCr converter, an image processor, two YCbCr to RGB converter, two color enforcement units, a head-mounted display, a signal voltage controller and a wireless communication module.

6 Claims, 2 Drawing Sheets

HEAD-MOUNTED VISUAL DISPLAY DEVICE WITH STEREO VISION AND ITS SYSTEM

FIELD OF THE INVENTION

The present invention generally relates to a head mounted visual display device and system and more particularly to a head mounted visual display device and system that processes separately the black and white elements and color elements of video signals to provide an optimal image quality in terms of clarity and brightness.

BACKGROUND OF THE INVENTION

The said head-mounted device (HMD) is a video display device that displays video provided by televisions, digital universal disc (DVD) devices, computer applications, game consoles or other similar appliances. The traditional single-signal input HMD can provide neither color contrast adjustment nor three-dimension vision and can easily lead to uncomfortable watching experience for users.

The current single signal input HMD does not provide ideal color luminance and hence poor video clarity and the brightness. Therefore, how to improve the process of color luminance is one of the main tasks that the industry tries to accomplish.

SUMMARY OF THE INVENTION

The current single-signal input HMD makes no significant breakthrough in color image process and can neither improve effectively the clarity and brightness of video nor provide three-dimension vision.

Therefore, the main objective of the present invention is to provide a head mounted visual display that processes separately the black and white elements and color elements of video signals in order to provide an optimal video clarity and brightness.

The secondary objective of the present invention is to provide a head mounted visual display device that can be used with either analog or digital extractors.

To achieve the above objectives, the present invention provides a head mounted visual display device that can be categorized into analog signal model and digital signal models.

The analog signal model of head mounted visual display device includes at least: a cabled or wireless analog video extractor that captures analog video signal of video data; a video decoder that receives the analog video signal from the video extractor and extract the analog video signal from the video;
a ITU-R.656 decoder that receives the analog video signal extracted from the video decoder and converts the analog video signal into digital video signal;
a de-interlacing unit that receives the digital video signal converted by the ITU-R.656 decoder and de-interlace the digital video signal that the signal will appear in sequence;
a shifter that receives the digital video signal processed by the de-interlacing unit, processes left shift, left rotation, right shift and right rotation on the digital video signal and provides the two outputs of the digital video signal;
two YCbCr to RGB converters that simultaneously receive the two digital video signals of the two outputs from the video processor and convert the YCbCr signal from the two digital video signal into RGB signal;
two color enhancement units that simultaneously receive the RGB digital video signals converted by the two YCbCr to RGB converters and enhance the color contrast of the digital signals;
two digital/analog (D/A) converters that simultaneously receive the two color-contrast-enhanced digital video signal from the two color enhancement units and convert to digital or analog according to the display unit;
a head mounted display unit that simultaneously receives the two video signals converted by the two D/A converters and provides simultaneously the video of the two video signals;
a signal voltage controller with bi-directional electrical connection to the video decoder provides the signal control bus ($I^2C$, Inter-Integrated Circuit), which is the circuit system bus and the detection of voltage, when a low-voltage is detected, a alerting signal is sent to the head mounted display unit.

The digital signal model of head mounted visual display device includes at least:
a cabled or wireless digital video extractor that captures digital video signal of video data;
a shifter that receives the digital video signal captured by the cabled or wireless digital video extractor, processes left shift, left rotation, right shift and right rotation on the digital video signal and provides the two outputs of the digital video signal;
two color enhancement units that simultaneously receive the two digital video signal output provided by the shifter and enhance the color contrast of the digital signals;
two digital/analog (D/A) converters that simultaneously receive the two color-contrast-enhanced digital video signal from the two color enhancement units and convert to digital or analog according to the display unit;
a head mounted display unit that simultaneously receives the two video signals converted by the two D/A converters and provides simultaneously the video of the two video signals;
a signal voltage controller with bi-directional electrical connection to the shifter provides the signal control bus ($I^2C$) of the circuit system bus and the detection of voltage, when a low-voltage is detected, a alerting signal is sent to the head mounted display unit.

To achieve these objectives, the present invention disclosed a head mounted visual display device that processes separately the black and white elements and color elements of video.

The detailed features and methods of the present invention are described thoroughly below with relevant figures.

DETAILED DESCRIPTION OF THE INVENTION

As shown in FIG. 1, the illustrative circuit diagram of the analog model of the present invention of a head mounted display device.

The analog signal model of head mounted visual display device (1) includes at least:
a cabled or wireless analog video extractor (11) that captures analog video signal of video data;
a video decoder (12) that receives the analog video signal from the cabled or wireless video extractor (11) and extract the analog video signal from the video;
a ITU-R.656 decoder (13) that receives the analog video signal extracted from the video decoder (12) and converts the analog video signal into digital video signal;
a de-interlacing unit (14) that receives the digital video signal converted by the ITU-R.656 decoder (13) and deinterlace the digital video signal that the signal will appear in sequence; a shifter (15) that receives the digital video signal processed by the de-interlacing unit (14), processes left shift, left rotation, right shift and right rotation on the digital video signal and provides the two outputs of the digital video signal while the shift amount and the rotation angle can be set in advance by computer program or external controlling circuit setting via an interface;

two YCbCr to RGB converters (16) that simultaneously receive the two digital video signals of the two outputs from the video processor (15) and convert the YCbCr signal from the two digital video signal into RGB signal;

two color enhancement units (17) that simultaneously receive the RGB digital video signals converted by the two YCbCr to RGB converters (16) and enhance the color contrast of the digital signals;

two digital/analog (D/A) converters (18) that simultaneously receive the two color-contrast-enhanced digital video signal from the two color enhancement units (17) and convert to digital or analog according to the display unit;

a head mounted display unit (19) that simultaneously receives the two video signals converted by the two D/A converters (18) and provides simultaneously the video of the two video signals;

a signal voltage controller (20) with bi-directional electrical connection to the video decoder (12) provides the signal control bus ($I^2C$) of the circuit system bus and the detection of voltage, when a low-voltage is detected, an alerting signal is sent to the head mounted display unit (19).

The algorithm for color saturation enhancement of the two color enhancement units (17) for a single pixel is described by using the formula in below:

1. The averaged sum of R, G, B values is taken as the brightness Y of that pixel.

$$Y = \frac{(R+G+B)}{3}$$

2. The maximum magnification zoom is calculated as the minimum of the magnification zoom of the three colors $$Mul = \min\left(\sqrt{\frac{255-R}{|R-Y|}}, \sqrt{\frac{255-G}{|G-Y|}}, \sqrt{\frac{255-B}{|B-Y|}}\right)$$

3. Adjust the coefficient between 0 and 1.

$CQ=(0\sim1)$

4. RGB converting formula $Rnew=(1+CQ*Mul)*(R-Y)+Y$ $Gnew=(1+CQ*Mul)*(G-Y)+Y$ $Bnew=(1+CQ*Mul)*(B-Y)+Y$ The head mounted display unit (19) includes at least: two micro-displays (191) that simultaneously receive the image signals converted by the D/A converters and present to the two micro-displays (191).

The signal voltage controller (20) includes at least: a voltage detector (201) that detects the voltage value and generates reference voltage data for voltage value analysis; a bidirectional serial communication controller (202) that provides signal control ($I^2C$) of the circuit system bus; a low voltage alerter (203) that a warning signal is sent to head mounted display (19) and upon receiving low voltage signal from voltage detector (201).

As shown in FIG. 2, it illustrates the circuit diagram of the digital model of the present invention of a head mounted display device. The digital signal model of head mounted visual display device (3) includes at least:

a cabled or wireless digital video extractor (31) that captures digital video signal of video data;

a shifter (32) that receives the digital video signal captured by the cabled or wireless digital video extractor (31), processes left shift, left rotation, right shift and right rotation on the digital video signal and provides the two outputs of the digital video signal while the shift amount and the rotation angle can be set in advance by computer program or external controlling circuit setting via an interface;

two color enhancement units (33) that simultaneously receive the two digital video signals bi-directional output provided by the shifter (32) and enhance the color contrast of the digital signals;

two digital/analog (D/A) converters (34) that simultaneously receive the two color-contrast-enhanced digital video signal from the two color enhancement units (33) and convert to digital or analog according to the display unit;

a head mounted display unit (35) that simultaneously receives the two video signals converted by the two D/A converters (34) and provides simultaneously the video of the two video signals;

a signal voltage controller (36) with bi-directional electrical connection to the shifter (32) detects the voltage value, when a low-voltage is detected, a alerting signal is sent to the head mounted display unit (35).

The algorithm for color saturation enhancement of the two color enhancement units (33) for a single pixel is calculated using the formula in below:

1. The average for a single pixel is taken as the brightness Y of that pixel.

$$Y = \frac{(R+G+B)}{3}$$

2. The maximum magnification zoom is calculated as the minimum of the magnification zoom of the three colors $$Mul = \min\left(\sqrt{\frac{255-R}{|R-Y|}}, \sqrt{\frac{255-G}{|G-Y|}}, \sqrt{\frac{255-B}{|B-Y|}}\right)$$

3. Adjust the coefficient between 0 and 1.

$CQ=(0\sim1)$

4. RGB converting formula $Rnew=(1+CQ*Mul)*(R-Y)+Y$ $Gnew=(1+CQ*Mul)*(G-Y)+Y$ $Bnew=(1+CQ*Mul)*(B-Y)+Y$ The head mounted display unit (35) includes at least: two micro-displays (351) that simultaneously receive the image signals converted by the D/A converters (34) and present to the two micro-displays (351).

The signal voltage controller (36) includes at least: a voltage detector (361) that detects the voltage value and generates reference voltage data for voltage value analysis; a bidirectional serial communication controller (362) that provides signal control ($I^2C$) of the circuit system bus; a low voltage alerter (363) that a warning signal is sent to head mounted display (35).

Although the invention has been explained in relation to its preferred embodiment, it is not used to limit the invention. It is to be understood that many other possible modifications

DESCRIPTION OF MAIN COMPONENTS

Figure 1:
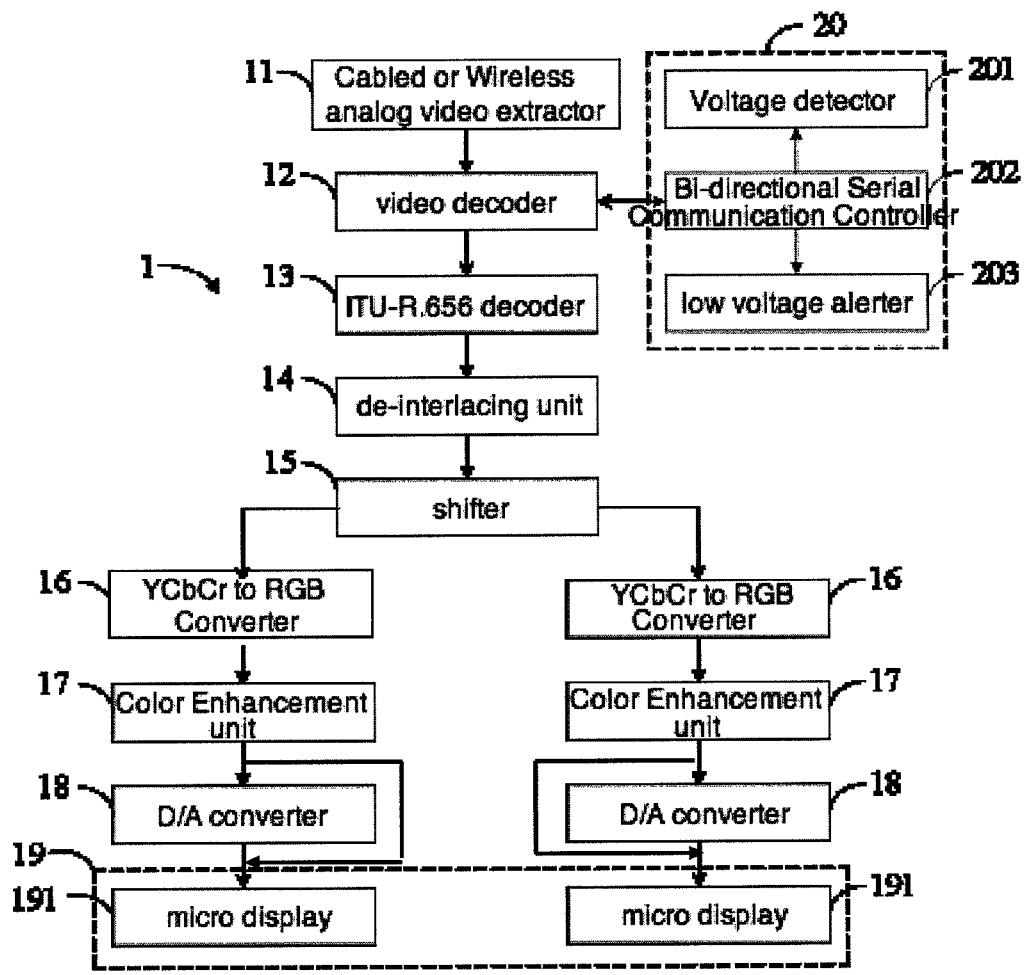
FIG. 1 is the illustrative circuit diagram of the analog signal model of the present invention of a head mounted display device.
Figure 2:
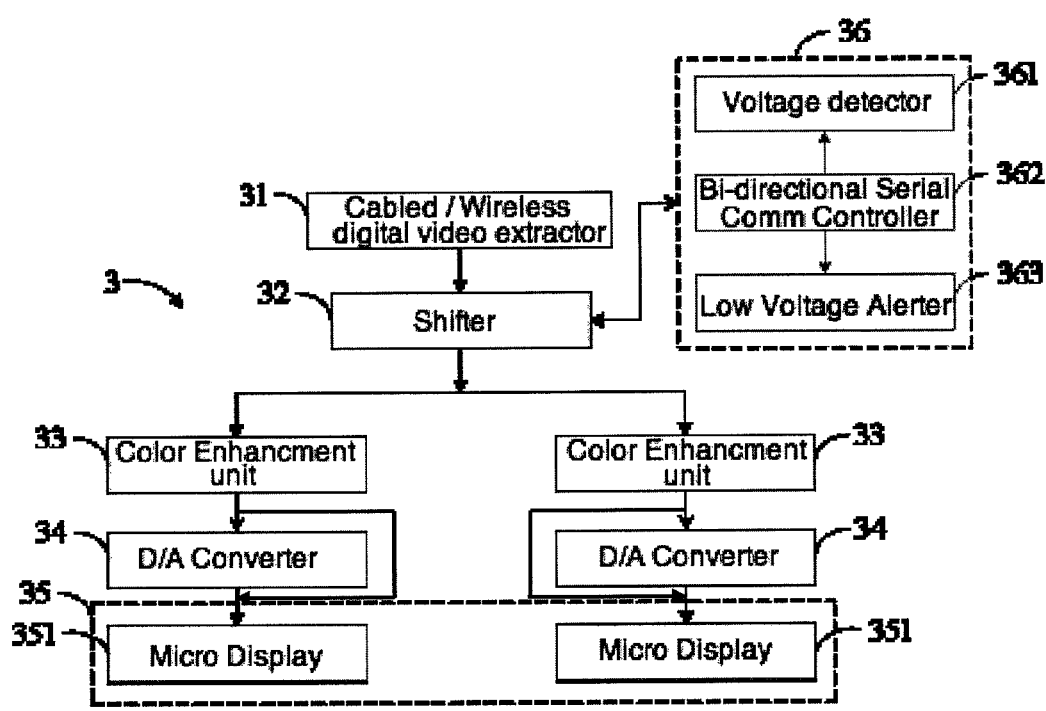
FIG. 2 is the illustrative circuit diagram of the digital signal model of the present invention of a head mounted display device.

1 A head-mounted, analog signal model of visual display device.
11 A cabled or wireless analog video extractor
12 Video decoder
13 ITU-R.656 decoder
14 de-interlacing unit
15 shifter
16 YCbCr to RGB converter
17 color enhancement unit
18 Digital/Analog (D/A) converter
19 head mounted display 191 micro display
20 signal voltage controller unit
201 voltage detector 202 bi-directional serial communication controller unit 203 low voltage alerter
3 A head-mounted, digital signal model of visual display device.
31 a cabled or wireless digital video extractor
32 Shifter
33 Color enhancement unit
34 Digital/Analog (D/A) converter
35 head mounted display 351 micro display
36 signal voltage controller unit
361 voltage detector 362 bi-directional serial communication controller unit 363 low voltage alerter

What is claimed is:

1. A analog signal model of head mounted visual display device includes at least:
   A cabled or wireless analog video extractor that captures analog video signal of video data;
   a video decoder that receives the analog video signal from the video extractor and extract the analog video signal from the video;
   a ITU-R.656 decoder that receives the analog video signal extracted from the video decoder and converts the analog video signal into digital video signal;
   a de-interlacing unit that receives the digital video signal converted by the ITU-R.656 decoder and deinterlace the digital video signal that the signal will appear in sequence;
   a shifter that that receives the digital video signal processed by the de-interlacing unit, processes left shift, left rotation, right shift and right rotation on the digital video signal;
   two YCbCr to RGB converters that simultaneously receive the two digital video signals of the two outputs from the video processor and convert the YCbCr signal from the two digital video signal into RGB signal;
   two color enhancement units that simultaneously receive the RGB digital video signals converted by the two YCbCr to RGB converters and enhance the color contrast of the digital signals;
   two digital/analog (D/A) converters that simultaneously receive the two color-contrast-enhanced digital video signal from the two color enhancement units and convert to digital or analog according to the display unit;
   a head mounted display unit that simultaneously receives the two video signals converted by the two D/A converters and provides simultaneously the video of the two video signals;
   a signal voltage controller with bi-directional electrical connection to the video decoder provides the signal control ($I^2C$) of the circuit system bus and the detection of voltage, when a low-voltage is detected, a alerting signal is sent to the head mounted display unit.

2. The head mounted visual display device of claim 1, wherein the head mounted display unit includes at least: two micro-displays that simultaneously receive the image signals converted by the D/A converters and present to the two micro-displays.

3. The head mounted visual display device of claim 1, wherein the signal voltage controller includes at least:
   a voltage detector that detects the voltage value and generates reference voltage data for voltage value analysis;
   a bidirectional serial communication controller that provides signal control ($I^2C$) of the circuit system bus;
   a low voltage alerter that a warning signal is sent to head mounted display upon receiving low voltage signal from voltage detector.

4. A head mounted visual display device, which includes at least:
   a cabled or wireless digital video extractor that captures digital video signal of video data;
   a shifter that receives the digital video signal captured by the cabled or wireless digital video extractor, processes left shift, left rotation, right shift and right rotation on the digital video signal and provides the two outputs of the digital video signal;
   two color enhancement units that simultaneously receive the digital video signals provided by the shifter and enhance the color contrast of the digital signals;
   two digital/analog (D/A) converters that simultaneously receive the two color-contrast-enhanced digital video signal from the two color enhancement units and convert to digital or analog according to the display unit;
   a head mounted display unit that simultaneously receives the two video signals converted by the two D/A converters and provides simultaneously the video of the two video signals;
   a signal voltage controller with bi-directional electrical connection to the shifter provides the signal control ($I^2C$) of the circuit system bus and the detection of voltage, when a low-voltage is detected, a alerting signal is sent to the head mounted display unit.

5. The head mounted visual display device of claim 4, wherein the head mounted display includes at least: two micro-displays that simultaneously receive the image signals converted by the D/A converters and present to the two micro-displays.

6. The head mounted visual display device of claim 4, wherein the signal voltage controller includes at least:
   a voltage detector that detects the voltage value and generates reference voltage data for voltage value analysis;
   a bidirectional serial communication controller that provides signal control ($I^2C$) of the circuit system bus;
   a low voltage alerter that a warning signal is sent to head mounted display upon receiving low voltage signal from voltage detector.

* * * * *